Aug. 12, 1958     P. A. MÜLLER     2,847,086
FILTERING MATERIAL

Filed Aug. 3, 1954     2 Sheets-Sheet 1

INVENTOR.
PAUL ADOLF MÜLLER
BY

Aug. 12, 1958 P. A. MÜLLER 2,847,086
FILTERING MATERIAL
Filed Aug. 3, 1954 2 Sheets-Sheet 2

INVENTOR.
PAUL ADOLF MÜLLER
BY
*[signature]*
AGT.

United States Patent Office 2,847,086
Patented Aug. 12, 1958

2,847,086

FILTERING MATERIAL

Paul Adolf Müller, Herrliberg, Switzerland

Application August 3, 1954, Serial No. 447,478

Claims priority, application Switzerland August 4, 1953

10 Claims. (Cl. 183—69)

The present invention relates to a filtering material suitable for all kinds of filters, such as air, dust, smoke and liquid filters. The invention is characterized by the employment of a basic material formed by at least one perforated fibre pad (basic pad). This basic pad may be of paper of various kinds, such as crepe paper. Other suitable materials for this basic pad are cellulose wadding, e. g. cotton wadding, wool wadding and the like. Basic pads of inorganic fibrous material, such as asbestos fibres, may be used if the filtering material is designed for use at elevated temperatures.

The basic pad may be readily developed into an efficient filtering material in two fundamentally different ways. The basic pad itself may be formed in a suitable manner so that the filtering action is particularly high, in that portions of the pad material displaced by perforating the material adhere to the basic pad, these portions and/or the marginal zones of the perforations being preferably frayed to a greater or lesser degree. Alternatively the basic pad may serve as a carrier for a further layer also consisting of fibrous material which is applied to the basic pad (carrier pad). This second pad must then perform the filtration proper and is therefore hereinafter referred to as the filter pad. The fibre structure is consequently somewhat looser in this filter pad than in the carrier pad, in particular if part of the fibres extend into or even through the perforations in the carrier pad. Finally the two different structures may be combined in a plurality of variants to achieve not only a better filtering action but an improvement of the adhesion or connection of the filter pad with the carrier pad by means of the portions displaced by perforating same, which remain on said carrier pad, in particular when fibres of the filter pad extend through the perforations in the carrier pad.

A number of embodiments are shown in diagrammatical views in the drawing, in which.

Figure 2:
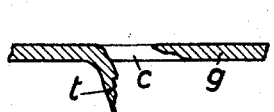
Figs. 1–6 show filtering material of the first type.
Figure 1:
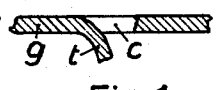
Figure 3:
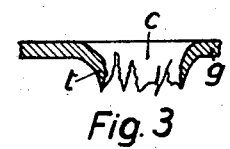
Figure 4:
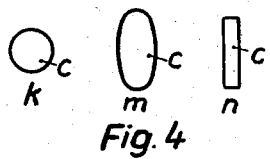
Figure 5:
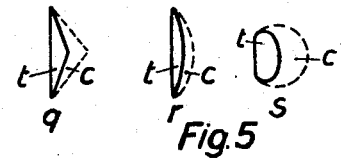
Figure 6:
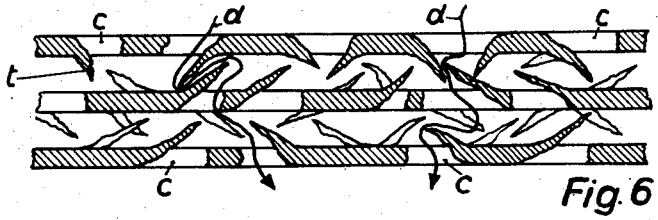

In Figs. 1–3 $g$ is a fragmentary section of a perforated basic pad formed of fibrous material, such as crepe paper having the perforations $c$. In all three embodiments the portions $t$ displaced by and during perforation $c$ adhere to the basic pad. In the embodiment according to Fig. 1 the portion $t$ has smooth edges, i. e. they are not frayed. In the embodiments according to Figs. 2 and 3 the edges are frayed, only part of the portion in Fig. 2 adhering to the basic pad $g$, while the portion $t$ is more or less entirely connected with the basic pad $g$. If it is desired to fray the fibres at the edges of the perforations and the displaced portions $t$ to a considerable extent, a material should be chosen which frays to a large extent on tearing, e. g. a material similar to blotting paper. In Fig. 4 three end views of shapes $k$, $m$, $n$, of the perforations $c$ present in the basic pad are shown, $k$ being circular, $m$ oval, $n$ rectangular. Fig. 5 similarly shows further possible shapes $q$, $r$, $s$ of the perforations, the broken lines indicating the opening and the full lines the displaced and projecting portions $t$. Finally Fig. 6 shows a section through an embodiment of a filtering material composed of a multi-layer filter body with several pads $g$, e. g. three superposed layer-pads being formed of the basic material according to Fig. 2 which achieve a relatively good filtering action by virtue of the action of the more or less interlaced portions or frayed projections $t$, the filtered gas or medium being forced to pass by and between the frayed projections $t$ in the direction of the arrows $d$. The perforations $c$ have open bases, are spaced from each other and are defined by said offset frayed projections $t$ of fibrous material, which are directed toward each other within the spaces between each two adjacent filtering layers $g$, as shown, thereby providing a tortuous path for smoke or gaseous medium streaming within the spaces between said layers.

As seen in Fig. 6 the perforations in the layers may be formed so that some of the projections $t$ extend from one side of the respective layer and others extend from the opposite side as shown in the intermediary or center layer of Fig. 6 so that interengagement or interlacing of projections of any layer with projections of an adjacent layer may be attained.

Figure 7:
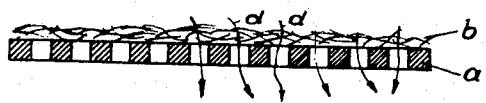
Figs. 7–14 show filtering material of the second type.

Fig. 7 shows the simplest embodiment of a filtering material of the second type consisting of two layers, the first, basic pad $a$ being the carrier pad, e. g. of perforated paper, the second, $b$, the filter pad also consisting of fibrous material and applied to the carrier pad $a$. The medium to be filtered can therefore penetrate the perforations $c$ of the basic pad $a$ as indicated by arrows $d$. It is, however, previously filtered by the filter pad $b$.

Figure 8:
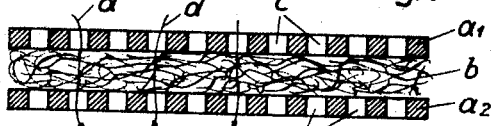

Fig. 8 shows a filtering material having three pads. The perforated carrier pads $a_1$ and $a_2$ form the outer boundaries of the material between which is inserted the filter pad $b$ made of fibrous material. The medium to be filtered flows, as indicated by arrows $d$, through the perforations $c$ of the upper carrier pad $a_1$, is then filtered by the filter pad $b$, and then passes through the perforations of the lower carrier pad $a_2$. The filtering material may comprise five, seven or more pads instead of three, the outer boundaries being in every case formed by perforated carrier pads.

Figure 9:
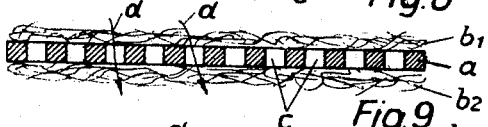
Figure 10:
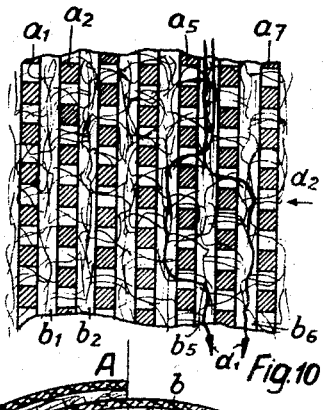

Fig. 9 shows an embodiment having three pads in which the outer boundary, however, is formed by filtering pads $b_1$ and $b_2$. Between these filter pads $b_1$ and $b_2$ is arranged the perforated carrier pad $a$. The medium to be filtered will therefore be filtered twice during its passage through the filtering material, as indicated by arrows $d$. In this embodiment, too, the number of pads is not limited to three. There may, for instance, be thirteen pads as shown in Fig. 10. In this embodiment seven carrier pads $a_1$–$a_7$ are provided, each having applied to it two filter pads $b_1$–$b_6$. With such material the filtering action is particularly good irrespective of whether the medium to be filtered passes the material in the direction of the full-line arrow $d_1$ or the broken-line arrow $d_2$.

Figure 12:
Figure 11:

A further improvement of the filtering action may be attained by embodiments according to Figs. 11 and 12. In the embodiment according to Fig. 11 the filtering material comprises two pads similar to that shown in Fig. 7, a perforated carrier pad $a$ and a filter pad $b$ formed of fibrous material. It differs from the embodiment shown in Fig. 7 in that part of the fibres of the filter pad $b$ extend into or through the perforations $c$ of the carrier pad $a$. The embodiment according to Fig. 12 corresponds to the principle of the embodiment according to Fig. 9 with the difference, however, that fibres of the two filter pads $b_1$ and $b_2$ extend through the perforations $c$ of the perforated carrier pad $a$ arranged between the two filter pads $b_1$ and $b_2$.

Figure 13:
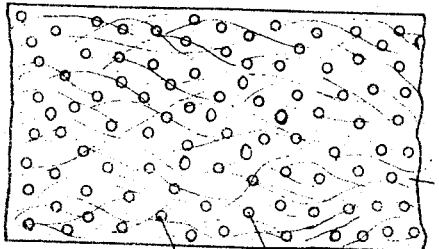
Figure 14:
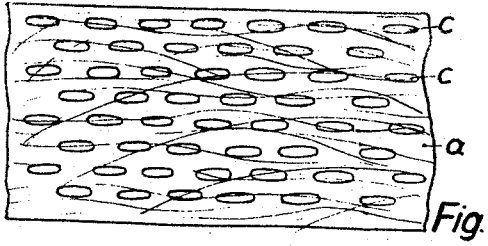

The embodiments of the second type described are only some fundamental embodiments of a filtering material according to the present invention. Many modifications can be effected by altering the number and arrangement of the two pad types. In respect of the formation of the perforations in the perforated carrier pad several embodiments are possible. The perforations may, for instance, be arranged on regular or irregular patterns, they may have identical shapes of equal or different size or they may be of different shapes and sizes. The perforations may, for instance, be circular having the same or different diameters, such as shown in Fig. 13 in which $a$ indicates the carrier pad and $c$ the perforations. A more slot-like configuration of the perforations $c$ is shown in Fig. 14, it being obvious that the openings $c$ need not be disposed so regularly in the carrier pad $a$ as shown in Fig. 14. Furthermore it is possible to combine the filtering materials of the first and second types in a variety of ways. Such an embodiment is shown by way of example in Fig. 15 in which are shown in section and particular layer formation three carrier pads $g_1$, $g_2$, $g_3$ of the type illustrated in Fig. 6. Between the perforated sheets or pads $g_1$, $g_2$ and $g_2$, $g_3$, respectively, are inserted filter layers or pads $b_1$, $b_2$ of which the fibres partly extend into the perforations $c$. This embodiment ensures particularly good adhesion of the fiber pads $b_1$, $b_2$ to the carrier pads $g_1$, $g_2$, $g_3$. Moreover it is clear that the filtering action is excellent.

Figure 16:
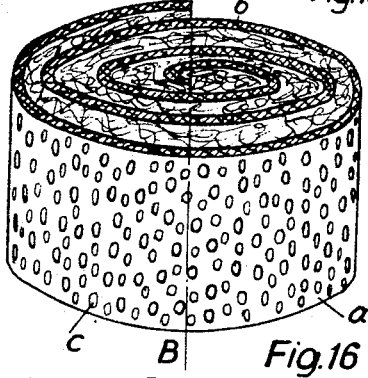
Figs. 16 and 17 show the manner in which filtering bodies are manufactured from the filtering material according to this invention.
Figure 17:
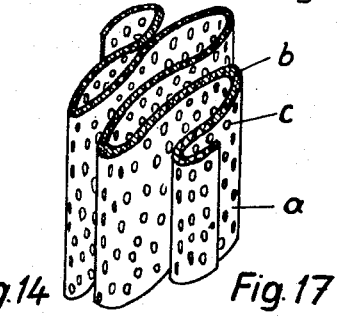

Figs. 16 and 17 show two further possibilities of forming the mentioned filtering material into a filter body. In Figs. 16 the filtering material is wound about an axis AB and forms a roll. In the embodiment according to Fig. 17 the filtering material is first folded and then shaped to form an essentially round cylindrical body only a sector thereof being shown.

Figure 18:
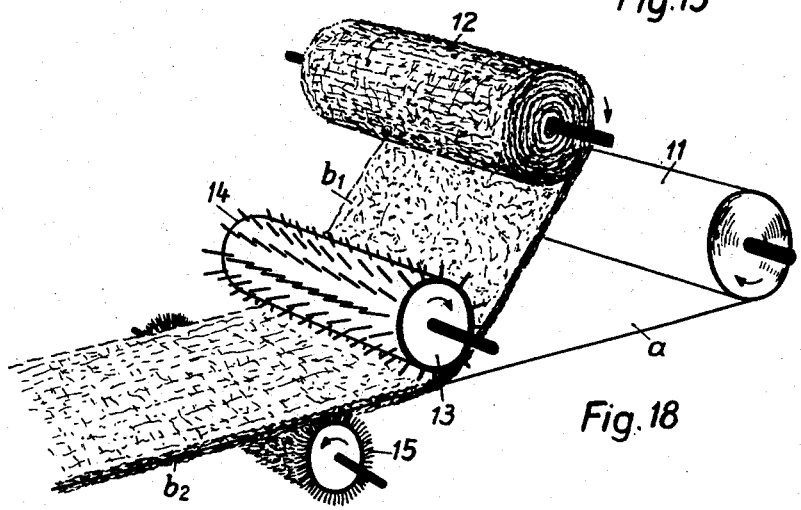
Fig. 18 is a diagrammatic view of a device for the manufacture of a filtering material having the structure according to this invention.

Finally, Fig. 18 is a diagrammatic view of a device suitable to produce filtering material having a perforated carrier pad $a$ which has applied to it two filter pads $b_1$ and $b_2$.

The filter pad $b_1$, e. g. a cotton pad supplied from a feed roll 12 is applied to an unperforated carrier pad $a$, e. g. paper, supplied from a feed roll 11. After application of the filter pad, the carrier pad is perforated, e. g. by means of the perforating roller 13 having prongs 14 for this purpose. At the same time, the arrangement is so designed that the fibres of the filter pad $b_1$ will be pushed through the perforations $c$ by the prongs 14 of the perforating roller 13. On the other side of the carrier pad 2 is a device, e. g. a brush roller 15, by means of which the fibres projecting through the perforations $c$ can again be united to form a uninterrupted pad $b_2$. This enables a filtering material as shown in Fig. 12 to be produced in one operating cycle.

Figure 15:
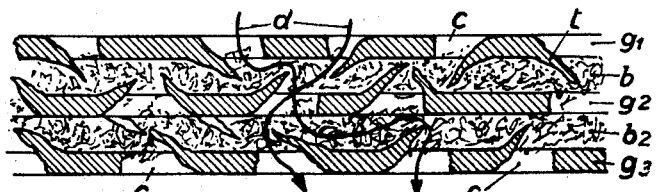
Fig. 15 shows a combination of filtering materials of the first and second types.

As stated above, the type of the basic or carrier pad and of the filter pad depends on the application of the filtering material. In embodiments, such as shown in Figs. 11 and 12, the fibres of the filter pad extend through the perforations of the carrier pad; it being advantageous to employ a material in which the fibres are arranged in a longitudinal direction and have a length superior to the distance between two perforations in the carrier pad. Materials suitable therefor are cellulose wadding of all kinds, such as cotton, wool, cellulosic wadding. In particular for a filter for tobacco smoke, e. g. cigarettes, such material will be used, the basic or carrier pad being preferably made of paper, such as tissue paper, crepe paper or other porous paper. For liquids, the carrier pad will advantageously be made of parchment paper, other impregnated paper or similar material. For filtering material subject to higher temperatures at which cellulose fibres are not resistant enough, inorganic fibrous materials will advantageously be used. In this case fibers of asbestos can be employed for the filter pad while very thin metal foils can be employed in the carrier pad. The filtering material according to this invention is particularly suitable for tobacco smoke filters as used in cigarettes if the filtering material is made into filter bodies such as shown in Figs. 16 and 17. Such a filter body has no uninterrupted longitudinal channels if the longitudinal axis of the cigarette extends in the direction AB (Fig. 16), i. e. the filtering action is particularly good, especially if a combination of the type according to Fig. 15 is used in which the passages for the smoke are substantially extended. A similarly good filtering action is obtained in other applications, e. g. in air conditioning plants, vacuum cleaners, where an exceptionally good inner filtering action is achieved despite the relatively small outer surface of the filter.

It can thus be seen that there has been provided according to the invention a filter body comprising a plurality of fibrous plies or layers, at least one layer made of fibrous structure being provided with spaced perforations, each perforation extending across and through said one layer and being defined by a wall engaging with fibers of an adjacent fibrous layer, to thereby enhance stability of said filter body and the filtering action thereof, the perforations of said one layer being defined by offset wall portions and said adajcent fibrous layer being also provided with perforations defined by offset wall portions, whereby said offset wall portions of both said layers are directed toward and substantially in contact with each other. Provision is further made to space said one layer from the other layer in such a manner that a third intermediate layer of fibrous substance having fibers relatively looser than the fibers of said first and second layers may be placed within said space with at least some of the fibers of said intermediate layer reaching into the perforations of said first and second layers.

Having now particularly described and ascertained the nature of my said invention and in what manner the same is to be performed, I declare that what I claim is:

1. Filtering means for tobacco smoke and like gaseous medium; comprising at least two adjacent layers of fibrous material having surfaces provided with a plurality of spaced openings defined by open bases and projections extending from said open bases and beyond said surfaces of the respective layers, said projections of said layers being directed toward each other and spacing the surfaces one from the other, said projections being made of said fibrous material and terminating in irregularly shaped frayed ends, whereby the projections of one layer may interlace with the projections of the other layer, to thereby provide a tortuous path for said medium between said layers and to thereby enhance the filtering action when said medium streams between said layers and along said surfaces of the latter.

2. Filtering means for a gaseous medium; comprising a plurality of adjacent layers of crepe paper material each provided with a plurality of spaced apart openings struck out of said material but leaving thereat projections extending from said openings therebeyond, said projections spacing respective opposite surfaces of adjacent layers from each other and being made of said crepe paper material terminating in irregularly shaped frayed ends, whereby the projections of one layer may interlace with the projections of an adjacent layer, to thereby provide a tortuous path between said layers for the passage of said gaseous medium between said layers and along said surfaces of the latter.

3. Filtering means for a gaseous medium; comprising a strip of material consisting of a plurality of adjacent layers made of the same fibrous material, each layer being provided with a plurality of spaced apart openings passing through the surfaces of said layers, and projections made of said material and extending from said openings and spacing opposite surfaces of adjacent layers and terminating in irregularly shaped, frayed and fibrous ends, whereby the projections of one layer may interlace with the projections of the adjacent layer, thereby contributing to the enhancement of the filtering action by thus providing a tortuous path for the medium between said layers and along said surfaces of the latter.

4. Filtering means according to claim 3, wherein said fibrous material consists of crepe paper.

5. Filtering means according to claim 3, wherein the openings of one layer are arranged in staggered relation with the openings of the adjacent layer, the peripheral confines of said openings being irregular in extent and shape.

6. Filtering means according to claim 3, said projections of said adjacent layers being of different lengths due to disintegration and displacement of said fibrous material when forming said openings.

7. Filtering means according to claim 3, wherein said projections are directed partly toward each other as well as lengthwise of said layers and within the space between said opposite surfaces of adjacent layers.

8. Multi-layer, fibrous filter means; comprising two outer layers and an intermediate layer, all said layers being made of fibrous material, said outer layers being provided with a plurality of spaced openings and with projections integral with the walls of said outer layers and extending from adjacent said openings toward said intermediate layer, said intermediate layer being provided with openings and with respective projections integral with the material of said intermediate layer and extending respectively in the directions of said outer layers, whereby interengagement of said projections of said outer layers with said intermediate layer may be attained upon compression of said layers upon each other, said projections terminating in irregularly shaped frayed ends, to thereby provide a tortuous path for a medium streaming through said layers and past said projections.

9. Multi-layer, fibrous filtering means comprising at least one first fibrous layer provided with spaced perforations extending therethrough and defined by fibrous wall portions projecting from the bases of said perforations, and at least a second layer provided with fibers interengaged with said fibrous wall portions of said first layer to thereby enhance stability and filtering action of said filtering means, said first and second layers being disposed in substantially parallel and spaced relation from each other for guiding therebetween a gaseous medium when entering said filtering means, said second layer being provided with perforations extending therethrough and defined by fibrous wall portions projecting from said second layer, the fibrous wall portions of said first and second layers being directed toward each other.

10. Filtering means according to claim 9, wherein both said layers are made from crepe paper.

References Cited in the file of this patent

UNITED STATES PATENTS

| | | |
|---|---|---|
| 2,113,431 | Milliken | Apr. 5, 1938 |
| 2,389,435 | Karlstrom | Nov. 20, 1945 |

FOREIGN PATENTS

| | | |
|---|---|---|
| 60,115 | Switzerland | Feb. 5, 1912 |
| 484,759 | Germany | Oct. 21, 1929 |